(12) United States Patent
Bauer et al.

(10) Patent No.: US 6,757,469 B2
(45) Date of Patent: Jun. 29, 2004

(54) TEMPERATURE INSENSITIVE OPTICAL WAVEGUIDE DEVICE

(75) Inventors: Monika Bauer, Senzig (DE); Jörg Bauer, Berlin (DE); Jürgen Schneider, Teltow (DE); Christian Dreyer, Niederwörresbach (DE); Huihai Yao, Berlin (DE); Norbert Keil, Berlin (DE); Crispin Zawadzki, Berlin (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 109 days.

(21) Appl. No.: 10/166,344

(22) Filed: Mar. 18, 2002

(65) Prior Publication Data

US 2003/0174991 A1 Sep. 18, 2003

(51) Int. Cl.[7] .................................................. G02B 6/10
(52) U.S. Cl. ...................... 385/129; 385/14; 385/37; 385/142
(58) Field of Search ................................ 385/1, 14, 24, 385/37, 129, 130, 142–144; 398/1, 79

(56) References Cited

U.S. PATENT DOCUMENTS

2003/0123828 A1 * 7/2003 Garito et al. ................ 385/129
2004/0005108 A1 * 1/2004 Johannessen ................ 385/14

FOREIGN PATENT DOCUMENTS

| WO | WO 0028361 | 5/2000 |
| WO | WO 0046621 | 8/2000 |
| WO | WO 0050937 | 8/2000 |
| WO | WO 0102878 | 1/2001 |
| WO | WO 0151967 | 7/2001 |

* cited by examiner

*Primary Examiner*—Phan T. H. Palmer
(74) *Attorney, Agent, or Firm*—Hunton & Williams LLP (57) ABSTRACT

The present invention relates in general to optical waveguide devices, which preferably are planar, e.g., optical arrayed waveguide gratings (AWGs), multiplexers/demultiplexers, optical add/drop multiplexers and the like. More particularly, the present invention provides integrated optical waveguide devices having central wavelengths (or channel wavelengths) which are temperature insensitive in that they do not or do almost not shift upon temperature variations in the environment. Such devices are also called athermalized or athermal devices. Preferably, most or all parts of such devices including waveguides, cladding material and the substrate itself consist of organic polymeric materials. The devices of the invention substantially remedy the problems encountered with the limitations and disadvantages of common devices as known in the prior art.

20 Claims, 9 Drawing Sheets

TEMPERATURE INSENSITIVE OPTICAL WAVEGUIDE DEVICE

FIELD OF THE INVENTION

The present invention relates in general to optical waveguide devices, which preferably are planar, e.g., optical arrayed waveguide gratings (AWGs), multiplexers/demultiplexers, optical add/drop multiplexers and the like. More particularly, the present invention relates to such planar optical waveguide devices the channel wavelengths or central wavelengths of which do not or almost do not shift upon temperature variations of the environment. Such devices are called athermal or temperature insensitive devices.

BACKGROUND OF THE INVENTION

Today in the time of internet, multimedia and telecommunication, the amount of data which has to be transferred is heavily increasing. So called killer-applications like video-on-demand, internet-telephone, video-conferencing, virtual-reality need more bandwidth, than it was imaginable some years ago. For long distance data transfer, fiber optic cables have almost completely replaced wires made of copper and now are extending even to local areas or even to housing networks. The goal to be attained is to have an all-optical network using fiber optic cables to every housing, even to every room and almost unlimited bandwidth for everyone.

Glass fibers have the enormous bandwidth of more than 40 TBps which is more than sufficient to transfer all telephone calls in the whole world through one single glass-fiber cable. However, only a small part of this potential is used so far. Actually worldwide optical fiber long-haul transmission systems are upgraded to 40 Gbit/s data rates and Prototype-systems are runned using about one TBps. One way to use an increased part of the glass fiber bandwidth is to use signals with different wavelengths. This method is the so called Dense-Wavelength-Division-Multiplexing. (DWDM). Most dramatic changes in telecommunications have occurred during the last several years after optical DWDM has been invented. Multiple bandwidth without even changing the fiber glass cable results therefrom. The huge success of DWDM technique has encouraged the telecom equipment vendors to boost network capacities further and further by introducing systems with more and more channels.

DWDM-Components are integrated planar optical waveguide devices which can be regarded as integrated optical circuits combining miniaturized waveguides and optical devices on an planar substrate. The glass fibers are attached to the input and output channels of the waveguide device. The integrated optical waveguides perform one or more functions or processes on the transmitted light (e.g. a DWDM-System combines light of different wavelength from the input-channels into one output-channel or vice-versa). Actually common integrated optical waveguide devices are realized by using silica-based planar lightwave circuits (PLCs). Currently, the arrayed waveguide devices are mainly produced in this silica technology. Cost issues, the low wavelength tuning range and, very important, the temperature dependence of the central wavelength of silica-based AWGs are, however, major problems involved in this technology.

Drift of the channel wavelengths or the central wavelength and therefore of the filter function of an AWG with temperature is a disadvantage resulting in a bad multiplexing/demultiplexing performance if the device is used in an environment where it is exposed to thermal fluctuations. Presently, this disadvantage is tried to be overcome by using a Peltier element to keep the device at a constant temperature. However, this results in another disadvantage in that an (additional) control-circuit and a power supply is required which causes additional costs.

In order to eliminate these additional disadvantages, temperature insensitive or athermal silica-based waveguide devices have been extensively investigated. For example, a polymeric over-cladding was used to reduce the effective thermo-optical coefficient (TO coefficient) from $1*10^{-5}$/K to $-0.24*10^{-6}$/K. However, this approach proved to be useful only in a relatively narrow temperature range. Another approach was to form several grooves in the arrayed-waveguide area which were filled with silicone adhesive exhibiting a negative TO coefficient. By this means, the temperature dependence was successfully suppressed with a deviation of ±0.02 nm in the temperature range from 0° to 85° C. Still another approach was reported wherein several trenches with a crescent shape in the input slab region were formed. In this way, the temperature sensitivity could be reduced to −0.0013 nm/K. However, both of the latter mentioned structures were susceptible to extra optical loss and extra phase errors. A common drawback of the said approaches is that a polyimide half-waveplate needs to be inserted in the arrayed waveguides for compensation of the polarization dependence. Respective disclosure is found in publications of international applications WO 01/51967, WO 00/46621, and WO 00/28361.

A different approach is the application of a movable input fiber in order to compensate for the temperature dependent wavelength shift which results in a complicated adjustment of the fiber.

WO 00/50937 deals with the question of affection of temperature changes to optical devices. It is contemplated that it could be beneficial to obtain an optical device wherein $d\lambda_0/dT$ which expresses the temperature sensitive response could be either set to zero or controlled within a desirable range. However, this application does not teach how to obtain a value of zero or almost zero for $d\lambda_0/dT$, and consequently, the invention disclosed therein deals with optical devices which are temperature sensitive.

AWG multi/demultiplexers based on organic materials used for the waveguide have been gaining increasing attention because organic polymer devices are believed to be producible at lower cost than their conventional silica based counterparts. However, not only lower production costs cause such polymers to be interesting candidates for integrated optical circuits. In addition, the refractive index can be adjusted and tuned over a broad range and thus, a high index contrast between core and cladding can be achieved. This results in a significant reduction of the device-dimensions Integrated optical waveguide devices (AWGs) are well known to the skilled artisan and are described in detail throughout the literature. Integrated optical waveguides made from polymeric waveguide materials are also well known to the skilled artisan and are described in detail throughout the literature. Exemplary AWGs include a silica doped waveguide circuit core or a polymeric waveguide circuit core, on a planar substrate, such as a fused silica member, a silicon wafer or the like. The use of polymeric substrates for optical waveguide devices is also known in the art, such substrates having the advantage of reducing the birefringence of the waveguide material and therefore the polarization shifts of the resulting device, see WO 01/02878.

Integrated AWG optical devices commonly contain a number of waveguide arms differing in their optical path length. Depending on the optical path length differences and the geometry, the light is assorted by its wavelength. Demultiplexing-devices comprise at least one input channel which transmits N optical signals at N different wavelengths ($\lambda_1, \lambda_2, \lambda_3, \ldots \lambda_N$) and at least N output channels each of which transmits exactly one of the N optical signals at an exactly determined wavelength. The more channels are used, the smaller is the range of the wavelength that can pass one particular channel. Thus, the more channels (or, the smaller channel spacings, respectively) are used, the more exactly the transmission maxima of the channels of the device must fit to the related wavelengths of the signals. Vice versa, a wavelength division multiplexer includes at least N input channels and at least one output channel. Every input-channel transmits one of the N optical signals ($\lambda_1, \lambda_2, \lambda_3, \ldots \lambda_N$) which are combined in the output-channel. Both devices can be combined into a multiplexing-demultiplexing device that can act as a multiplexer as well as a demultiplexer.

The wavelengths of the optical signals are preferably identical with the transmission maxima of the individual channels of the device because such an arrangement results in best device performance, e.g. the lowest optical loss and a low crosstalk. Hence it is strongly recommended to avoid a change of the central wavelength or channel wavelengths of the device.

SUMMARY OF THE INVENTION

Thus, it is an object of the present invention to provide integrated optical waveguide devices the central wavelengths (or channel wavelengths) of which are temperature insensitive in that they do not or do almost not shift upon temperature variations in the environment. Such devices are also called athermalized or athermal devices. Preferably, most or all parts of such devices including waveguides, cladding material and the substrate itself consist of organic polymeric materials. The devices of the invention substantially remedy the problems encountered with the limitations and disadvantages of common devices as known in the prior art.

Another object of the invention is to provide materials and material combinations suitable for the construction of integrated optical waveguide devices the central wavelengths (or channel wavelengths) of which are temperature insensitive in that they do not or do almost not shift upon temperature variations in the environment.

Still another object of the invention is to provide methods for producing integrated optical waveguide devices the central wavelengths (or the channel wavelengths) of which are temperature insensitive in that they do not or do almost not shift upon temperature variations in the environment. Specifically, the present invention provides materials and methods for the production of such materials the properties of which are properly selected to impart temperature insensitivity to the integrated optical waveguide devices produced therewith.

BRIEF DESCRIPTION OF THE DRAWINGS

The accompanying drawings are included to provide a further understanding of the invention and are incorporated in and a constitute part of this specification, illustrate the embodiments of the invention, and together with the description serve to explain the principles of the invention.

DETAILED DESCRIPTION OF THE INVENTION

The present invention provides an athermalized optical waveguide device comprising a waveguiding material and preferably a related bottom- and top-cladding material having a suitable difference in the refractive index to provide waveguiding of the light signals in the waveguide. The waveguiding material will usually have a negative thermo-optical (TO) coefficient (dn/dT) as it will most suitably be selected from organic polymer materials which in most cases show such a negative TO coefficient. Further, the athermalized optical waveguide device comprises a substrate which should preferably be a highly thermostable material. Preferably, also the substrate consists merely, or at least to a great part, of an organic polymer. The substrate of the device of the present invention has a coefficient of thermal expansion (CTE) suitable to compensate the drift of the channel-wavelengths which will occur due to changes of the operation temperature within a predetermined operating temperature range.

In a preferred embodiment of this invention, an athermalized arrayed waveguide grating (AWG) (Multiplexer/Demultiplexer) is provided. In an even more preferred embodiment, this AWG is completely prepared from organic polymer materials.

The optical waveguide device of the present invention can be selected from integrated optical devices, e.g. optical arrayed waveguide gratings (AWGs), multiplexers/demultiplexers, optical add/drop multiplexers and the like. Moreover, it is applicable to any other type of optical waveguide filters relying on the exploitation of optical path length differences, such as directional couplers, Fabry-Perot resonators, DFB and DBR-filters, MZI (Mach-Zehnder-Interferometer) filters, ring resonators and grating assisted couplers.

The optical waveguide device of the present invention includes a waveguide structure which can be a waveguide core supported on a preferably planar substrate. Preferably, either or both of the waveguide core and the substrate are made of an organic polymer material. The substrate is preferably a solid flat substrate made of a polymeric material with sufficient thermal and mechanical stability and with sufficient surface quality. The core can be placed on at least one bottom-cladding which is placed onto the polymeric substrate. Alternatively, the substrate itself can act as a bottom cladding material. The bottom cladding is preferably made of an organic polymer material having a slightly lower refractive index compared to that of the waveguide core to provide good waveguiding properties of the device. Usually, the difference in the refractive index is in the range of about 8 to $11\times10^{-3}$. Alternatively or in addition, the waveguide core may be covered by a top-cladding which is preferably made of a polymeric material having a likewise suitable refractive index in regard to the waveguide core, to provide good waveguiding properties of the resulting device.

In specific embodiments, the optical waveguide device includes a cladding material (top and/or bottom) having a continuously changing gradient of its refractive index. Alternatively, a top and/or bottom cladding is present which shows a stepwise gradient in the refractive index. Such a gradient may e.g. be obtained by spin coating different cladding layers having slightly but discrete differing refractive indices.

In other specific embodiments, the optical waveguide device includes a waveguide core material having a continuously changing gradient of its refractive index.

The waveguide core (respectively the optical waveguide circuit) has at least a first waveguide path and at least a second waveguide path wherein the said waveguide paths have a difference dL in their path length, suitable to provide an optical path difference which corresponds to suitable channel wavelengths $\lambda_n$, in the spectral region of 1500–1600 nm important for telecommunication and to provide a desired free spectral range, depending on the number of channels and to the channel spacing.

According to the invention, the coefficient of thermal expansion (CTE) of the substrate is adjusted in such a way that the expansion of the substrate completely or almost completely compensates the negative TO coefficient of the polymeric waveguide core and the cladding. By this measure, a temperature insensitive device can be obtained.

Preferably, the CTE of the substrate and the TO coefficient of the waveguide is chosen such that the temperature depending wavelength drift of the device is less than 0.010 nm/K, more preferably less than 0.16° nm over the whole range of usual operating temperatures (between 0° C. and 70° C.) of such devices, even more preferably less than 0.08 nm within an operating temperature range of 0° C. to 70° C. and most preferably less than 0.08 nm within an operating temperature range of –10° C. to 80° C., all values preferably for a channel-spacing of 200 GHz or 1.6 nm, respectively.

It is preferred to use organic polymers as materials for some, or, more preferably, all waveguide materials (core, top- and/or bottom-cladding). Such materials will have a negative TO-coefficient. The invention covers the cases with dn/dT(core)≡dn/dT(top-cladding)≡dn/dT (bottom-cladding). But to compensate the negative TO-coefficient of polymeric waveguide-material using an adapted Substrate, the TO-coefficients of core, top-cladding and Bottom-cladding needn't be identical, only the "effective" TO-coefficient is relevant. So the following cases are covered as well: The invention covers the cases with dn/dT (core)=dn/dT(top-cladding)=dn/dT (bottom-cladding) as well as dn/dT(core)<>dn/dT(top-cladding)<>dn/dT (bottom-cladding), dn/dT(core)<>dn/dT(top-cladding)=dn/dT (bottom-cladding), dn/dT(core)=dn/dT(top-cladding) <>dn/dT(bottom-cladding) and dn/dT(core)=dn/dT(bottom-cladding)<>dn/dT (top-cladding.

The TO-coefficients of polymers used for waveguide core and claddings are commonly in the range of $-3*10^{-5}$ to $-30*10^{-5}$ $K^{-1}$. According to the invention, a substrate is to be selected for the construction of the optical waveguide device the coefficient of thermal expansion (CTE) of which must have a respective value which, together with the TO coefficient of the waveguide core, will provide a very low or even no drift of the central wavelength (or channel wavelengths, respectively).

In preferred embodiments of the invention, the integrated optical waveguide device is an arrayed waveguide grating—division multiplexer/demultiplexer with a circuit core having an array of waveguide paths. Such devices are well known to the skilled artisan. The waveguide circuit core—which, as detailed above, is preferably made from an organic polymer material—comprises at least one first waveguide path and at least one second waveguide path which are adjacent to each other. In preferred embodiments of the invention, it comprises at least one input channel and two or more output channels or at least one output channel and two or more input channels. The present invention, however, also encompasses arrayed waveguide gratings having more than the said number of channels, and they may comprise a multiplicity of waveguide paths (up to some hundred).

The demultiplexing function is described as follows: A multiplexed optical signal consisting of N signals with N different discrete wavelengths ($\lambda_1, \lambda_2, \lambda_3 \ldots \lambda_N$) is transferred into one input channel. The coupling region (rowland circle) couples the signals into the waveguides of the grating. The arrayed waveguide grating separates (demultiplexes) the wavelengths ($\lambda_1, \lambda_2, \lambda_3 \ldots \lambda_N$) in such a way that they are coupled through a second rowland circle into their particular output-channel. The multiplexing function is described as follows: N optical signals with the discrete wavelengths ($\lambda_1, \lambda_2, \lambda_3 \ldots \lambda_N$) are put into their individual N input channels and coupled into the grating through the first coupler region. The arrayed waveguides combine the N wavelengths ($\lambda_1, \lambda_2, \lambda_3 \ldots \lambda_N$) such that the second coupler region transfers them into a common output-channel.

Both functions can be combined in one device as may be seen from the working examples.

In both functions, waveguide path length differences (ΔL) in the optical waveguide paths are used, as described above. The path length differences are selected such that an optical path difference is provided which corresponds to the wavelengths ($\lambda_1, \lambda_2, \lambda_3 \ldots \lambda_N$) of the (multiplexed) signal. The optical path differences are preferably selected to correspond to the suitable wavelengths ($\lambda_1, \lambda_2, \lambda_3 \ldots \lambda_N$) in the spectral range between 1500 and 1600 nm important for telecommunication.

The drift of the central wavelength of an AWG can be expressed by the following Equation (1), where $\lambda_0$ represents the central wavelength, T is the temperature, and $n_c$ indicates the effective refractive index of the waveguide:

$$\frac{d\lambda_0}{dT} = \lambda_0 \left( \frac{1}{n_c} \cdot \frac{dn_c}{dT} + \frac{1}{\Delta L} \cdot \frac{d\Delta L}{dT} \right) \quad (1)$$

Both, the effective refractive index $n_c$ and the length of the waveguides are temperature dependent. Therefore, also the physical path length differences ΔL are temperature dependent. The value of dn/dT is about $10^{-5}$ K$^{-1}$ for silica materials. For the case of organic polymer materials as preferred in the present invention, dn/dT is increased by the order of about one magnitude and has a negative sign (i.e., it is in the range of $-5*10^{-5}$K$^{-1}$ and $-50*10^{-5}$K$^{-1}$).

The second term within the brackets of equation (1), 1/ΔL*dΔL/dT, corresponds to the coefficient of thermal expansion (CTE) of the substrate. Therefore, equation (1) can be expressed in the form of equation (2) as shown below:

$$\frac{d\lambda_0}{dT} = \left( \frac{dn_c}{dT} + n_c \cdot \alpha_{sub} \right) \cdot \left( \frac{\lambda_0}{n_c} \right) \quad (2)$$

In Equation (2), $\alpha_{sub}$ represents the CTE of the substrate. Thus, it can be deviated that an athermal condition of the device can be obtained by adjusting the CTE of the substrate and the thermooptical coefficient (TO) of the waveguiding material. Equation (3) expresses the athermal condition of an AWG as follows:

$$\left( \frac{dn_c}{dT} \right) + n_c \cdot \alpha_{sub} = 0 \quad (3)$$

Specifically, the TO coefficient (dn$_c$/dT) of waveguides made from organic polymers is negative. On the other hand, the CTE of substrates specifically made from organic polymers, $\square_{sub}$, is positive. When the TO-coefficient of the waveguide materials is matched to the CTE of the substrate such that equation (3) is fulfilled, an athermal optical device (AWG) is obtained.

The principle of adjusting the substrate CTE to the TO coefficient of the waveguide material as described in this invention can be used by a skilled artisan for the preparation of related optical devices having "athermal" behaviour.

According to the invention, optical waveguide devices which are insensitive or almost insensitive against temperature shifts in their environment and therefore are in an "athermal condition", are obtained by selecting a substrate having a CTE which completely or almost completely matches or fits to the TO of a given or selected waveguide according to the above equation (3); on the other hand, the athermal condition can be achieved by selecting a waveguide material the TO coefficient of which completely or almost completely fits to the CTE of a given or selected substrate material. As a third possibility, both materials are suitably selected to have CTE and a TO values which suitably fit each other according to the above equation (3). In case a cladding, more specifically a bottom cladding, is also present in the optical waveguide devices of this invention, it is advisable to chose a material for the said cladding the TO coefficient of which is identical or almost identical to that of the waveguide. Preferably, CTE of the substrate and TO of the waveguide are selected such that the temperature dependent wavelength shift d$\lambda_0$/dT (for a device having a channel-spacing of 200 GHz, 1.6 nm respectively) is less than 0,010 nm/K, more preferably less than 0,16 nm over the range of about 0° C. to 70° C. (the usual operating temperature of the devices of the present invention) and most preferably less than 0,08 nm within an operating temperature range of from −10° C. to 80° C. These values can be calculated as follows:

Tolerable deviations from the central wavelength of an athermal optical device depend on the channel spacing. For 400 GHz, the channel spacing is 3.2 nm, for 200 GHz (as used in the device of example 4), the channel spacing is 1.6 nm, and for 50 GHz, it is 0.4 nm. The wavelength shift should be not more than +/−10% of the channel spacing, preferably not more than +/−5%, and more preferably not more than +/−2.5%.

The particular tolerable deviations are shown in Table 1 below, covering a temperature range of from −10° C. to +80° C.:

TABLE 1

| Channel spacing | | preferable wavelength shift for the whole temperature range | | more preferable wavelength shift for the whole temperature range | | most preferable wavelength shift for the whole temperature range | |
|---|---|---|---|---|---|---|---|
| GHz | nm | | nm | | nm | | |
| 400 | 3.2 | +/−10% | ±0.32 | +/−5% | ±0.16 | +/−2.5% | ±0.08 |
| 200 | 1.6 | of | ±0.16 | of | ±0.08 | of | ±0.04 |
| 100 | 0.8 | channel | ±0.08 | channel | ±0.04 | channel | ±0.02 |
| 50 | 0.4 | spacing | ±0.04 | spacing | ±0.02 | spacing | ±0.01 |

It should be kept in mind that also the values $n_c$, $dn_c/dT$ and $\alpha_{sub}$ of a given material are slightly temperature dependent. Therefore, it is preferred that the materials are selected such that the TO coefficient of the waveguide material(s) and the CTE of the substrate material(s) match over a broader temperature range, for example, from 0° C. to 70° C., more preferably from −10° C. to +80° C.

For a given TO value (e.g. −1.16 to −0.9×10⁻⁴), the CTE value required to obtain a perfectly temperature insensitive or "athermal" optical waveguide device, e.g. an athermal AWG, can be calculated by using equation (3). The tolerable range within which the CTE of the substrate may vary in order to fit the requirements pointed out in Table 1, can be calculated by using equation 4 below:

$$\Delta \alpha_{Sub} = \frac{\Delta(d\lambda_0)}{dT \cdot \lambda_0} \quad (4)$$

By transforming equation 2 above using a $\lambda_{0min}$ and a $\lambda_{0max}$ (defining the minimum or the maximum, respectively, of the range covering tolerable values for the central wavelength), equation 4 can be easily obtained. Is can be seen therefrom that the range within which the CTE may be properly varied is independent of the effective refractive index $n_c$ and also of the thermooptic coefficient $dn_c/dT$. The CTE-variation range ($\Delta\lambda_{Sub}$) only depends on $\Delta$ ($d\lambda_0$)= $\lambda_{0min}-\lambda_{0max}$, i.e. the tolerable shift of the central wavelength, on the central wavelength $\lambda_0$ itself and, which is easily found, on the temperature range (dT) as defined for the specific cases. The absolute CTE-values, on the other side, are of course strongly dependent from $n_c$ and $dn_c/dT$.

It may be deduced from the above that the CTE of the substrate should preferably show a deviation from the "ideal" CTE for perfect athermal condition of not more than between +/−2 ppm/K (for 400 GHz), +/−1 ppm/K (for 200 GHz, as used in Example 4) and +/−0.25 ppm/K (for 50 GHz) if a deviation from the central wavelength is aimed at which is not more than +/−10%, and that the CTE of the substrate should more preferably show a deviation from said "ideal" CTE of not more than between +/−1 ppm/K (for 400 GHz), +/−0.5 ppm/K (for 200 GHz as used in Example 4) and +/−0.13 ppm/K (for 50 GHz), if a deviation from the central wavelength is aimed at which is not more than +/−5%, and that the CTE of the substrate should most preferably show a deviated from said "ideal" CTE of not more than between +/−0.5 ppm/K (for 400 GHz), +/−0.25 ppm/K (for 200 GHz as used in Example 4)and +/−0.06 ppm/K (for 50 GHz), if a deviation from the the central wavelength is aimed at which is not more than +/−2.5%.

Figure 3:
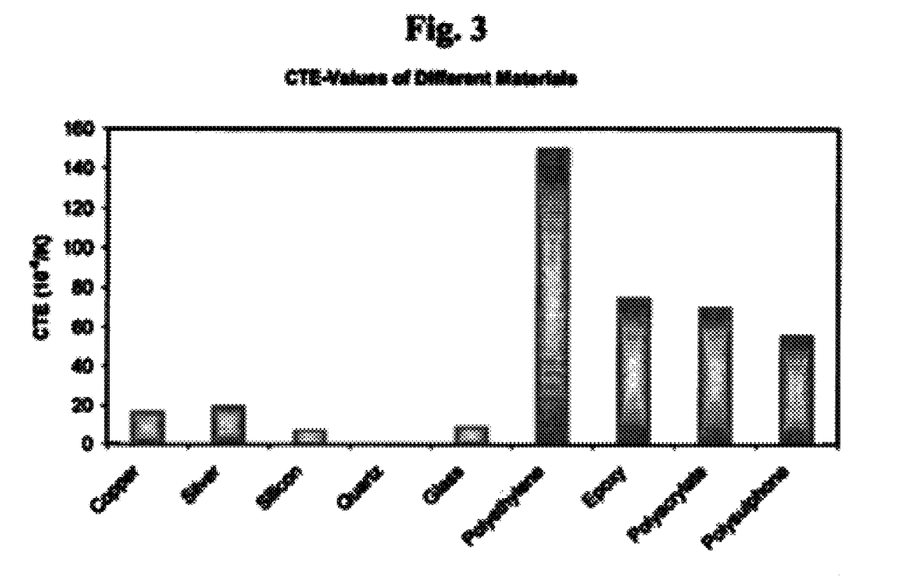
FIG. 3 shows CTE values of a variety of materials used in integrated optics.

According to the invention, the substrate material can be selected from any material as far as this material has a CTE value which opens the possibility to combine it with a waveguide material the TO coefficient of which is able to match with the said CTE value according to equation (3) above. Common polymeric and inorganic materials cover a broad range of CTEs, as shown in FIG. 3. It is specifically preferred that the materials to be used as substrate and as waveguide core are organic polymers. Moreover, it is also preferred that the materials selected for the cladding s, if such claddings are present, are also organic polymers.

The waveguide core and the claddings, if any, can be made from the same class of polymer, as well as from different classes. Further, the top cladding and the bottom cladding can be prepared from the same class of polymer, as well as from different classes. The term "polymer class" as used in this connection is intended to express the fact that all members of such a class contain the same functional groups or at least functional groups which react in a comparable way.

Instead, at least one of the materials (core, top-cladding, bottom cladding) can be selected from inorganic materials.

The optical waveguide device as described in this invention has several advantages:

No additional heating/cooling elements and therefore no additional electronic control circuits and no additional power supply are needed.

The production costs are potentially lower than those of silica based pendants because of the inexpensive production technology of the polymeric waveguides and lack of requirement for a peltier element.

The adjustment of the substrate CTE produces no additional optical loss.

Matching of the substrate CTE and the waveguide TO coefficient results in a reduction of the polarization dependence of the device.

AWGs produced in all polymer technique provide smaller dimensions than the silica pendants because a higher contrast in the refractive indices between core and cladding can be realized.

The present invention further provides specific organic polymer materials and combinations of such materials to be used as substrates, on one side, and as waveguide materials, on the other hand, which have been specifically developed to fulfill the requirements of the present invention. Further, the present invention is also directed to the synthesis of such materials, specifically to materials which may be used for the production of substrates or of waveguides to be used in optical devices according to the present invention. Such materials and the production thereof are described in the examples in more detail.

Waveguide materials should be selected from those which include a low propagation loss at the 1.55 μm wavelength window, a low birefringence, a high thermal stability, and an easy control of the refractive index to form the buffer, core and cladding layers. Preferably, they are made from organic materials the properties of which can be adapted to meet a variety of physical and/or chemical properties as required or desired. Therefore, they are preferentially chosen out of the group of materials comprising polyimides, polycyanurates, acrylates, silicones, epoxides, polyvinylchlorides, polyamides, fluorinated polymers, PFCBs, PCB, Polyester, Polyether, Teflon and comparable materials.

Preferably, the materials contain no or only small amounts of OH— and NH-groups because such groups show high absorption in the wavelength range between 1500 and 1600 nm. More preferably, the materials are fluorine containing. The optical loss of C-F groups is lowered by about one order of magnitude, compared to that of C-H groups, and by about two orders of magnitude, compared to that of N-H groups and OH groups. Therefore, it is preferred that the materials not only contain a very low amount of N-H or OH groups as detailed above, but also a decreased amount of C-H groups. Of course, the amount of C-H groups can alternatively or in addition be kept low by other means, e.g. by replacement of C-H groups by C-D groups.

It is further preferred to use a material having a low intrinsic birefringence, in order to keep the polarization dependence of the resulting device low. Polyacrylates, for example, show such a low intrinsic birefringence and therefore have been widely used as optical waveguide materials because of their optical clarity, low birefringence and the availability of a wide range of monomers. In the present invention, such materials can also be used. They show a very good structurizability, as may e.g. be seen from a SEM-micrograph of a RIE-structurated polyacrylate waveguide given in FIG. 6 and a cross section of an acrylate waveguide onto a polymeric substrate in FIG. 7. The roughness of the waveguide-walls is very low, the walls are vertical and the bottom area is smooth. Thus, its shape is rectangular.

However, it should be kept in mind that the material can freely be chosen as long as it shows properties which makes it suitable for the intended use and therefore may freely be selected by a skilled artisan, provided that a material is selected for a respective substrate to be combined therewith having a CTE which matches the TO coefficient of the material selected for the waveguide.

The substrate material can freely be chosen as long as it fits the requirements of the present invention. In one embodiment of the present invention, the substrate material of the optical devices is preferably selected from thermo-setting materials or so called reactive resins. A useful group of materials comprises epoxides (e.g. Araldit LY 556 from Ciba Speciality Chemicals Inc), polycyanurates or polycy-anates (e.g. AroCy B-10 from Lonza AG), bismaleimides (e.g. Compimide 796 from Technochemie), bismaleimide triazine resins (e.g. BT 2400 from Mitsubishi Gas Chemical Comp., Inc.) and the like or mixtures of such resins which partly are commerically available and partly known from the literature. The said materials ("reactive resins") are thermo-setting plastics. The substrates prepared therefrom have a high thermostability which is a desired effect. Substrates of this kind are described in WO 01/02878 the disclosure of which is hereby incorporated by reference. Of course, other temperature resistant materials can be used, e.g. thermoplas-tic substrates like PEEK (polyetheretherketones), polyimides, PES (polyethersulfones), (per)fluorinated poly-ethylenes and comparable materials. Also other thermosets like epoxides, phenolic resins, bismaleimides etc. and com-binations thereof can be used also as a substrate material, if these materials fit the CTE requirements and thermostability etc.

In another specific embodiment of the invention, the substrate material is an interpenetrating network which results from use of at least two polymeric systems which—and the components of which—cannot react with each other. For example one of the said polymeric systems is a poly-cyanurate ester resin.

In another specific embodiment of the present invention, the substrate material can be selected from a thermosetting material or a reactive resin in combination with an organic polymer, selected from at least one of natural and synthetic rubbers and thermoplastic polymers. Specific materials of this kind are disclosed in WO 01/81492 the disclosure of which is hereby incorporated by reference. For example, the thermosetting material or reactive resin may be a polycy-anate or polycyanurate resin.

Waveguide production is done by techniques which are common in the semiconductor industry and can be easily performed by someone who is skilled in the art. The production of single-mode optical waveguide, for example, may start with the substrate which can e.g. be prepared from organically polymerizable monomers or prepolymers, optionally in the presence of comonomers or the like, as it is known from the art. Additives may be added, e.g. fillers, polymerization initiators, stabilizers, or coupling agents, as a skilled person is aware of. After the substrate has been solidified, a buffer layer can be overlayered onto the substrate, if such buffer is desired, e.g. by spin-coating it onto the substrate. It may be dried and (if necessary) cured.

Figure 6:
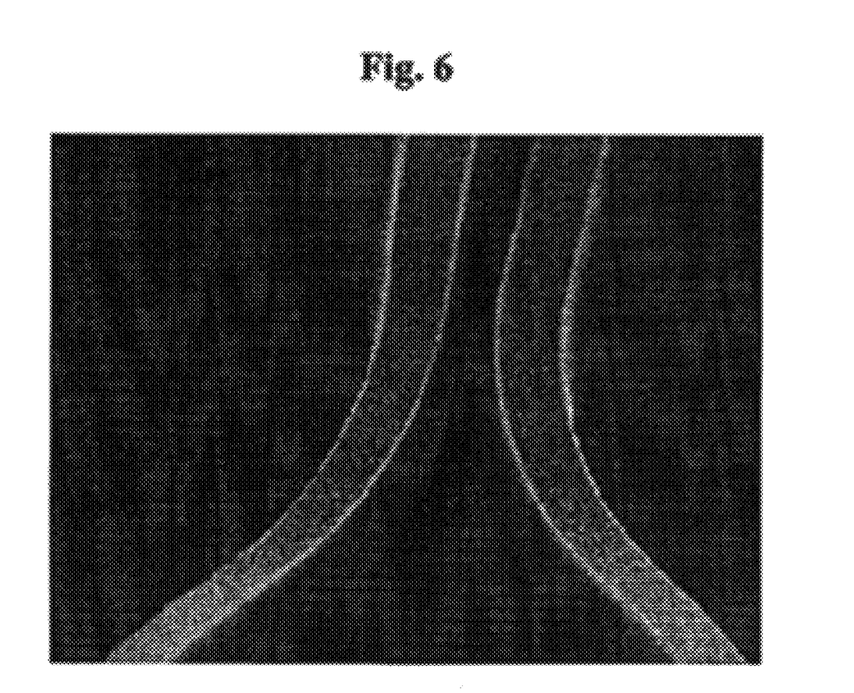
FIG. 6 is a SEM-micrograph of a RIE-structurated polyacrylate waveguide.
Figure 7:
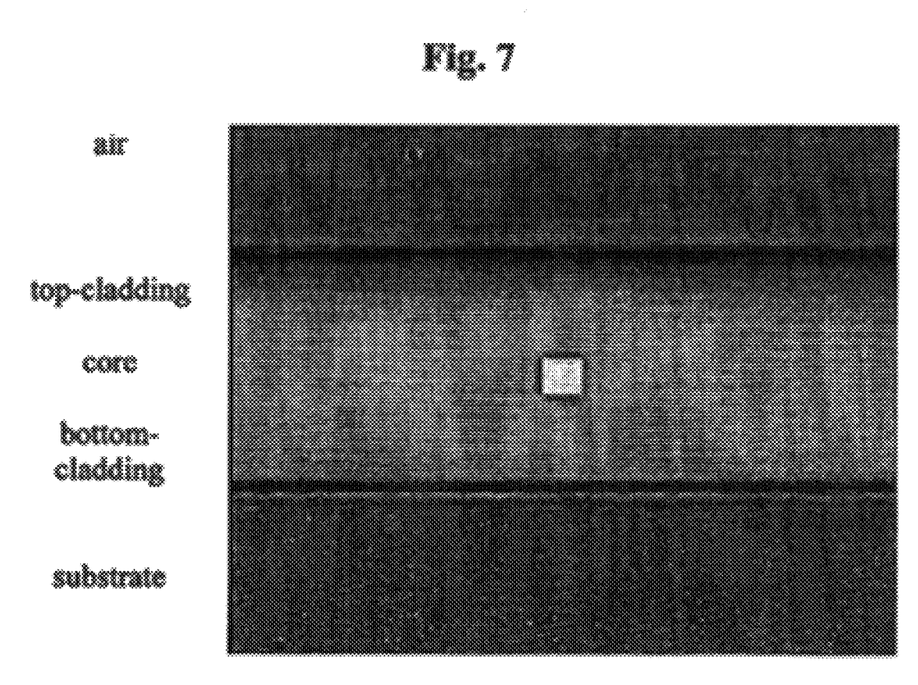
FIG. 7 shows a cut through a polymeric waveguide placed onto a polymeric substrate. Substrate, bottom-cladding, waveguide core and the top-cladding can be seen in that figure.
Figure 8:
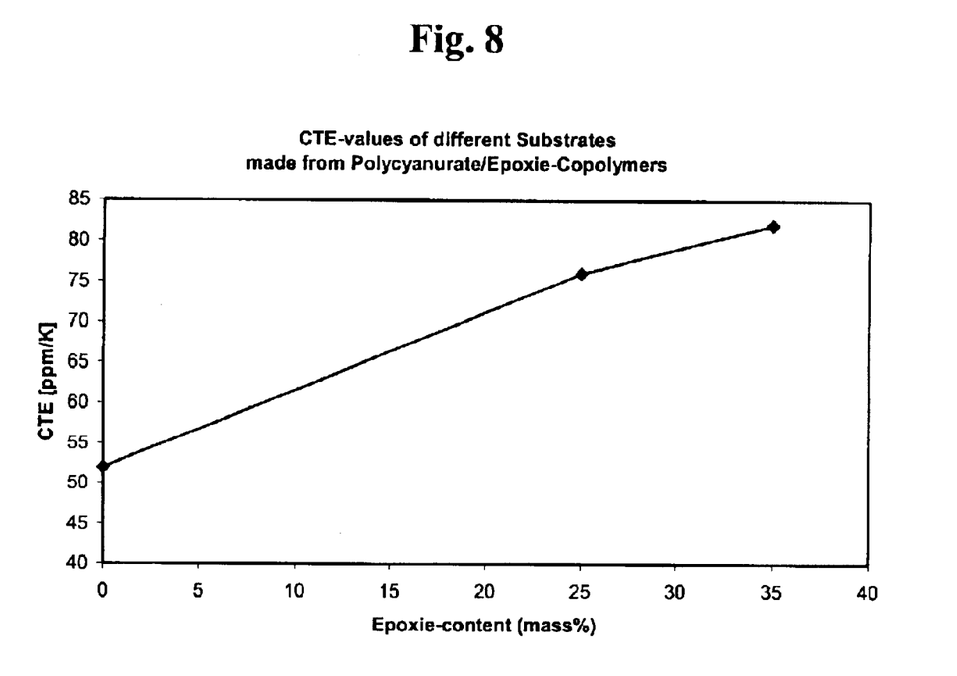
FIG. 8 is a diagramm showing the CTE values of different substrates made from polycyanurate/epoxy copolymers according to example 2, which depend on the concentration of the epoxymonomer added (in mass % of the sum of the starting materials)

The following step is the application of the guiding layer, e.g. by spin-coating and curing of the coated material. Next, a photoresist may be applied, e.g. by spin-coating, and desired parts thereof are irradiated with UV-light. The pho-toresist is developed and a mask is applied, e.g. by sputtering aluminum onto its surface. The remaining photoresist and the mask on its top can be removed by a subsequent lift-off process or the like. This step is followed by structurization. Subsequently, the guiding layer can be structurized, e.g. by reactive ion etching (RIE). (In case the waveguide material itself has the properties of a photoresist, use of an additional photoresist and of a mask and RIE structurization or the like is of course not required.) Last, the remaining parts of the mask are removed, and a cladding layer is applied to the top of the structurized waveguide, e.g. by spin coating, if desired. FIG. 6 shows such a waveguide production process. In FIG. 8, a cross section through a polymeric waveguide placed on a polymeric substrate is shown. Substrate, bottom-cladding, waveguide core and the top-cladding can be seen in that figure.

If the substrate of the device according to the invention is prepared from thermosetting materials like epoxides, poly-cyanurates or polycyanates, bismaleimides and the like as detailed above, the uncured resin (if necessary after lique-fidication by applying sufficient heat) is preferably casted into a suitable mould. If necessary or favorable, a vacuum or a reduced pressure is applied, e.g. using a vacuum drying oven. Subsequently, the resin is cured using a suitable temperature or temperature profile. Not more but very little mechanical stress in the molded articles is obtained by low cooling of the moulds until environmental temperature is reached. After demoulding, the obtained substrates may be mechanically treated or machined, e.g. cut, sawed, milled or sinked. In accordance to the requirements of the surface to be met in order to ensure correct application of the optical layers, the surface may be polished using common methods which are e.g. known from the technology of silicon wafers.

All-polymer AWG wavelength routers were fabricated and characterized. These devices exhibit good optical per-formance with respect to optical loss, crosstalk, and polar-ization dependence. As the primary result of this invention, however, it has been demonstrated that the temperature dependence of the wavelength is controllable through adjusting the CTE value of the substrate to the TO coefficient of the waveguide, or vice versa. An athermal device, asso-ciated with polarization-independence, was realized through properly matching the CTE of the polymer substrate and the TO coefficient of the polymer waveguide.

The invention will now further be explained by way of examples.

EXAMPLE 1

Synthesis of Fluorinated (Meth)acrylate Copolymers Useful as Materials for the Preparation of Optical Waveguides (Core and Optional Cladding).

A mixture of 5–30 weight-% of a fluorinated aromatic monomer (e.g. pentafluorostyrene (PFS) or pentafluorophe-nyl methacrylate), 35–70 weight-% of a fluorinated aliphatic (meth)acrylate (e.g. 2,2,2-trifluoroethylmethacrylate or 2,2, 2-trifluoroethylacrylate) and about 30–40 mol-% of glycidyl methacrylate or acrylate were dissolved in 1,4-dioxane to form a 10 weight-% solution. 1–3 weight-% of dibenzoyl peroxide or azodiisobutyronitrile referring to the monomer amount was added and also dissolved. The mixture was heated to 65 to 90° C. (dependent on kind of initiator) using an oil bath in a three necked round bottomed nitrogen purged flask equipped with reflux condenser, stirrer, thermometer, nitrogen in- and outlet. After about 5 hours the reaction mixture was cooled on room temperature and the polymer was precipitated by pouring the dioxane solution in an eightfold excess of water under stirring. The copolymer would be isolated by filtering from the liquor and dried at 40° C. under vacuum. For further cleaning the copolymer was redissolved as a 10 weight-% solution in ethyl acetate. The solution was pressure-filtered through a 0.2 mikron teflon membrane, reprecipitated in ethanol filtered off and dried as described above. The polymers show an average molecular mass of 20,000–30,000 (GPC).

Figure 5:
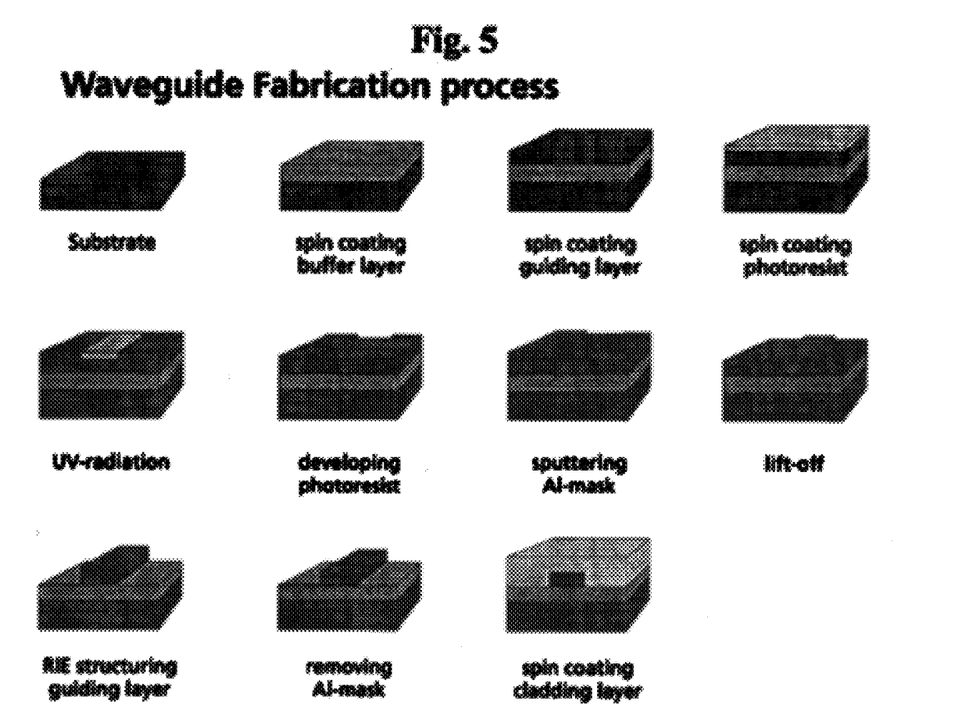
FIG. 5 is a scheme depicting a possible waveguide production process.

The measured refractive index of thin layers of the corresponding copolymers has been found to exhibit a linear dependence of the PFS concentration, as shown in FIG. 5. It can be seen that the refractive index of the polymer composite can be well matched to suitable waveguide materials and that a refractive index contrast, Δn, up to 0.011 can be readily obtained, to cover the low and high refractive index contrast values being of interest for integrated optical waveguides. It was found that the control of the refractive index-contrast was highly reproducible. Even higher index-contrasts are possible.

EXAMPLE 2
Preparation of Substrates.

Figure 9:
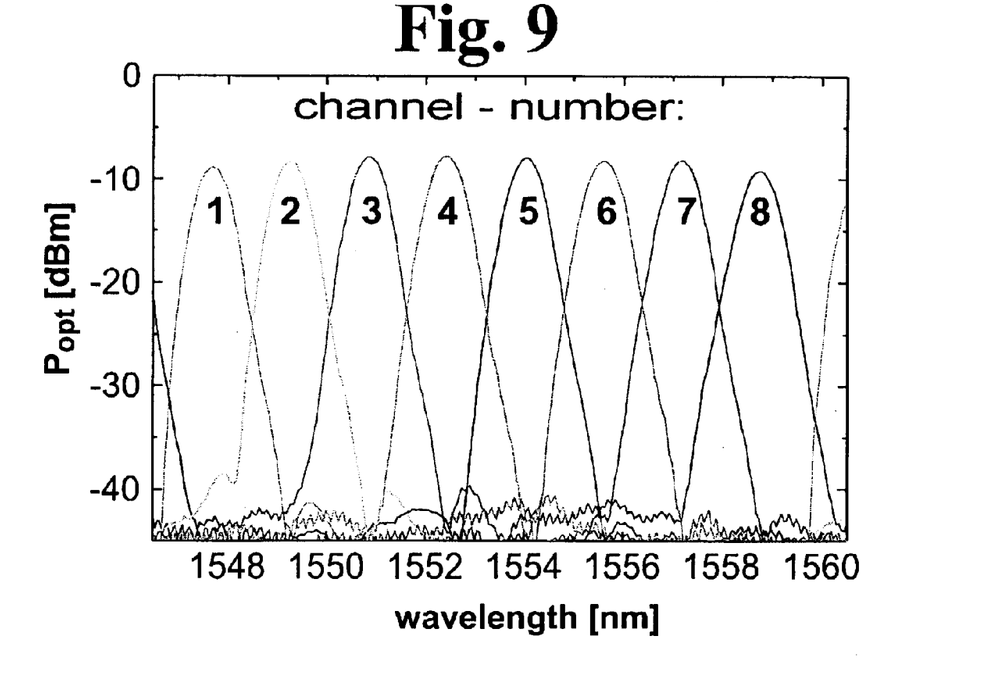
FIG. 9 depicts the measured transmission spectra of an all-polymer 8×8AWG prepared according to example 3.

As known (Bauer, M. et al. (1989) Acta Polym. 40, 335; (Bauer, M. et al. (1989) Acta Polym. 40, 397; Bauer, M. And Bauer, J. (1989) Makromol. Chem., Macromol. Symp., 30, 1; Shimp, D. A. and Wentworth, J. E. (1992) In: Advanced Materials and Structures from Research to Application, eds. Brandt, J. et al. SAMPE, European chapter, Basel, 67–78) the co-reaction of cyanate esters with glycidyl ethers is not only able to modify the branching density of the resulting network drastically, but also its chemical composition. If one or more difunctional epoxide monomers are added to the starting cyanate monomers or are part of the comonomers or prepolymers used, the CTE of the substrate can be adjusted in a wide range as shown by FIG. 9.

Therefore, polycyanate resins were chosen for this example.

2.1. Substrate A (α=56 ppm/K):
Used Monomers:
Arocy® B10 (100 mass-%)

9 g AroCy® B10 (Lonza AG) are heated to 90° C. in a round bottomed flask and the melted material is degassed at 2–3 kPa for 30 min. The melt is poured into a casting mould as e.g. known from FIG. 1 of WO 01/02878, having an inner diameter d of 3" (7,62 cm) and a thickness of about 3 mm. Subsequently the mould is brought into a drying oven in order to cure the resin. The temperature profile applied is: 20 h at 180° C., 30 min. to reach 200° C., 1 h at 200° C., 30 min. to reach 220° C., 1 h at 220° C., 30 min. to reach 240° C., 1 h at 240° C., 30 min. to reach 260° C., 1 h at 260° C., 30 min. to reach 280° C., 1 h at 280° C., cooling to room temperature with a rate of 0.5 K/min. After releasing the substrate from the mould, the rim is trimmed using abrasive paper, then the disk is grinded and polished with a convetional polishing maschine, to obtain a flat surface with optical quality. A firm stable disk or plate is obtained, having 3" diameter and a thickness of about 1.3 mm after grinding and polishing. The measured CTE was 56 ppm/K.

2.2. Substrate B (α=73 ppm/K):
Used Monomers:
Arocy® B10 (75 mass-%)
Bis(glycidoxypropyl)containing monomer (BGCM)(25 mass-%)

Figure 2:
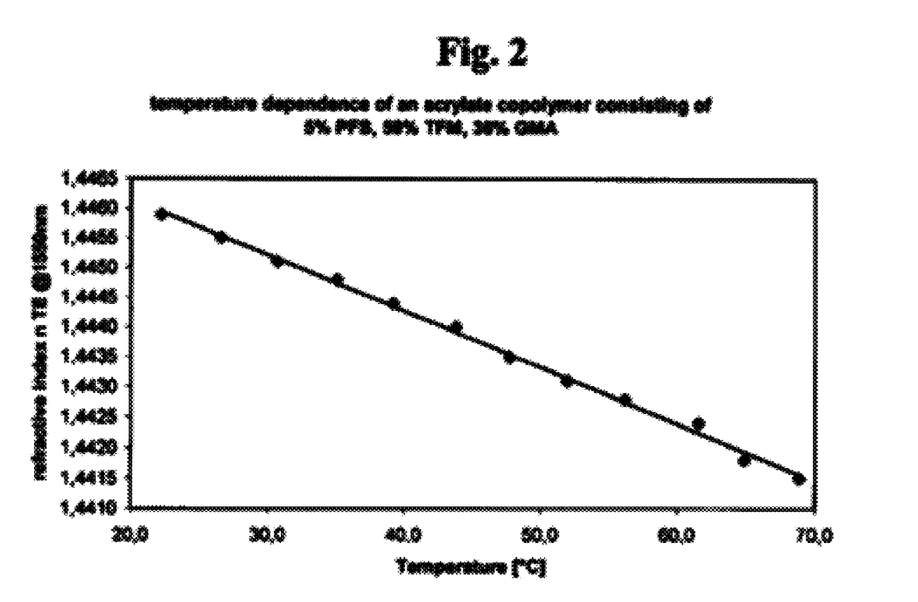
FIG. 2 shows the changing of the refractive index of a fluorinated acrylate, consisting of 5% PFS, 59% TFM, and 36% GMA, with temperature.

134,30 g AroCy® B10 (Lonza AG) and 44,77 g BGCM are heated to 85° C. in a round bottomed flask and the melted material is degassed at 2–3 kPa for 20 min. The melt is poured into a prewarmed (140° C.) sealable casting mould as e.g. known from FIG. 2 of WO 01/02878, having inner dimensions of 22×12×0.6 cm. Subsequently the mould is brought into a drying oven in order to cure the resin. The temperature profile applied is: 30 h at 140° C., 30 min. to reach 160° C., 1 h at 160° C., 30 min. to reach 180° C., 1 h at 180° C., 30 min. to reach 200° C., 1 h at 200° C., 30 min. to reach 220° C., 1 h at 220° C., 30 min. to reach 240° C., 1 h at 240° C., 30 min. to reach 260° C., 1 h at 260° C., cooling to room temperature with a rate of 0.5 K/min. After releasing from the mould, a stable plate is obtained, two disks having a diameter of 3" (7.62 cm) were obtained by CAD-moulding machine. The disks were cut into each three plates with a thickness of about 1.3 mm using a high-precision saw, used regularly for sawing of silicone-monocrystals, the plates were polished to obtain optical surface quality. The measured CTE was 73 ppm/K.

2.3. substrate C (α=80 ppm/K):
Used Monomers:
Arocy® F10 (62 mass-%)

Bis(glycidoxypropyl)containing monomer (BGCM)(38 mass-%)

Figure 1:
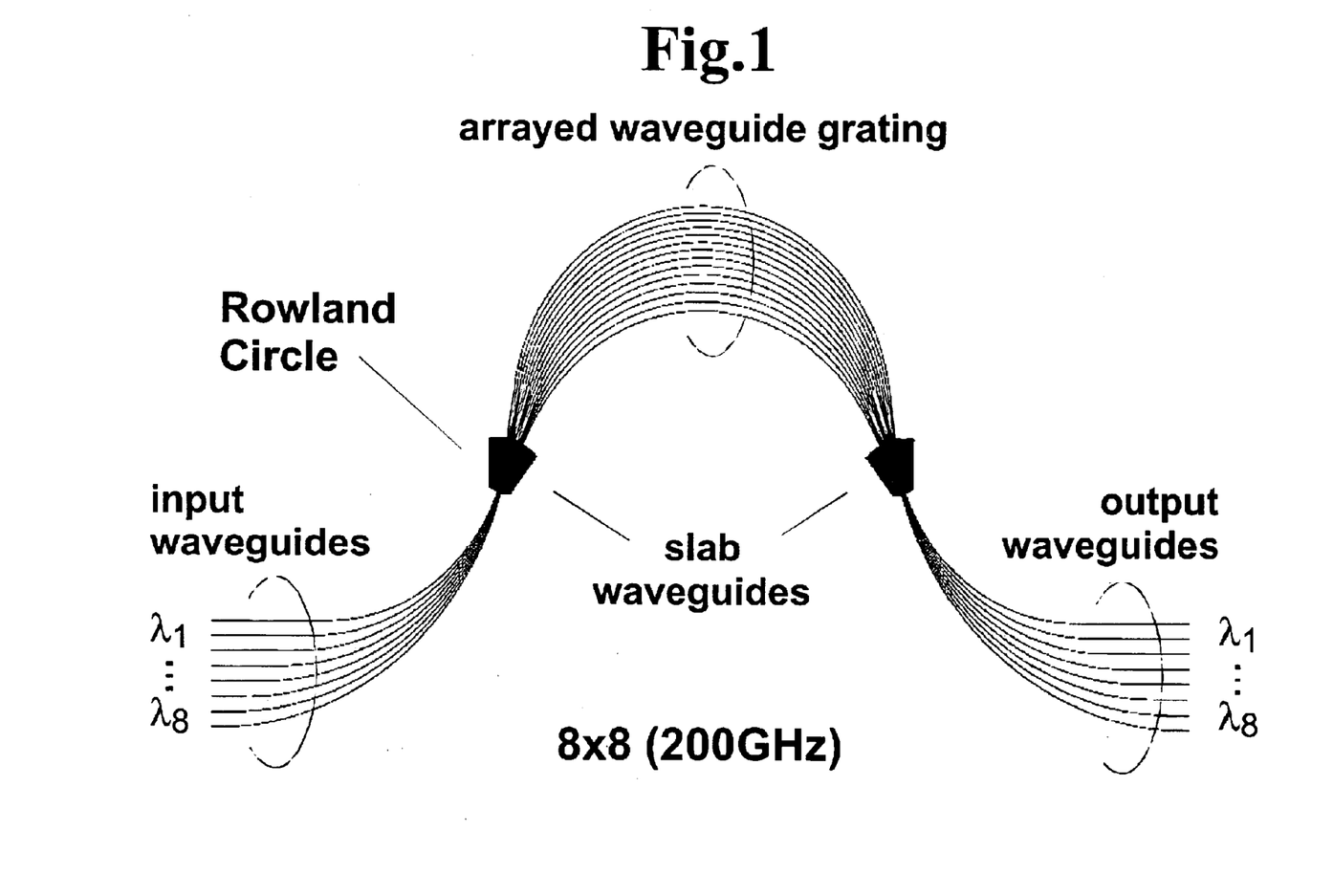
FIG. 1 is a schematic top-view of a preferred optical waveguiding device, on the base of an arrayed waveguide grating, with the function of a Multiplexing/demultiplexing unit. The 8 input and also the 8 output-channels are printed, too.

30 g of the mixture AroCy® F10 (Lonza AG) (62%) and BGCM (38%) are heated to 90° C. in a round bottomed flask and the melted material is degassed at 2–3 kPa for 30 min. The melt is poured into a casting mould as shown in FIG. 1 of WO 01/02878, having an inner diameter d of 3" (7,62 cm) and a thickness of about 6 mm. subsequently the mould is brought into a drying oven in order to cure the resin. The temperature profile applied is: 20 h at 140° C., 30 min. to reach 160° C., 1 h at 160° C., 30 min. to reach 180° C., 1 h at 180° C., 30 min. to reach 200° C., 1 h at 200° C., 30 min. to reach 220° C., 1 h at 220° C., 30 min. to reach 240° C., 1 h at 240° C., cooling to room temperature with a rate of 0.5 K/min. After releasing the substrate from the mould, the rim is trimmed using abrasive paper. The disk was cut into each two plates with a thickness of about 1.3 mm using a high-precision saw, used regularly for sawing of silicone-monocrystals. Then the plates were polished with a conventional polishing machine, to obtain a flat surface with optical quality. A firm, stable disk or plate is obtained, having 3" diameter and a thickness of about 1.3 mm after grinding and polishing. The measured CTE was 80 ppm/K.

EXAMPLE 3
Production of a Single-mode Optical Waveguide.

The production scheme starts with the preparation of the substrates A, B, or C of example 2. For the preparation of the waveguide structure and the cladding layers, respective solutions are prepared from the (meth)acrylate copolymers as obtained according to example 1 by dissolving the polymer in an adequate solvent, preferably 2-ethylethoxyacetate, for proper application. These solutions contain also 0.5–2.0 weight-% of a cationic photoinitiator (triarylsulphonium phosphate or antimonate) referred to the copolymer weight. A polyacrylate buffer or cladding layer is prepared by spin-coating a solution made from an acrylate composition containing 59.2% trifluoroethylmethacrylate (TFM), 35.8% (glycidylmethacrylate) GMA and 5% pentafluorostyrene (PFS), all percentages referring to the mass of the composition onto the substrate and drying. The dried layer was heated on a heating plate up to 120° C. and irradated at the same time with an 250 W UV-lamp for 15–30 min. The thickness of the buffer is typically 15–20 $\mu$m. The second step is spin-coating and curing of the guiding layer (waveguide layer) (made from an acrylate composition containing 35.4% TFM, 34.6% GMA and 30% PFS, all percentages referring to the mass of the composition, dissolved in 2-ethylethoxyacetate), having a typical thickness between 6 and 8 $\mu$m. Next, the photoresist is spin-coated, and desired parts thereof are irradiated with UV-light. The photoresist is developed and an aluminum-mask is sputtered onto it. The remaining photoresist and the aluminum on its top will be removed by the following lift-off process. The guiding layer can now be structurized by reactive ion etching (RIE). Then the aluminium-mask is removed and the cladding layer is spin-coated on the top of the structurized waveguides. FIG. 5 shows the waveguide production process.

EXAMPLE 4

Preparation of an Athermal AWG Multiplexing/demultiplexing Device and Results.

Figure 4:
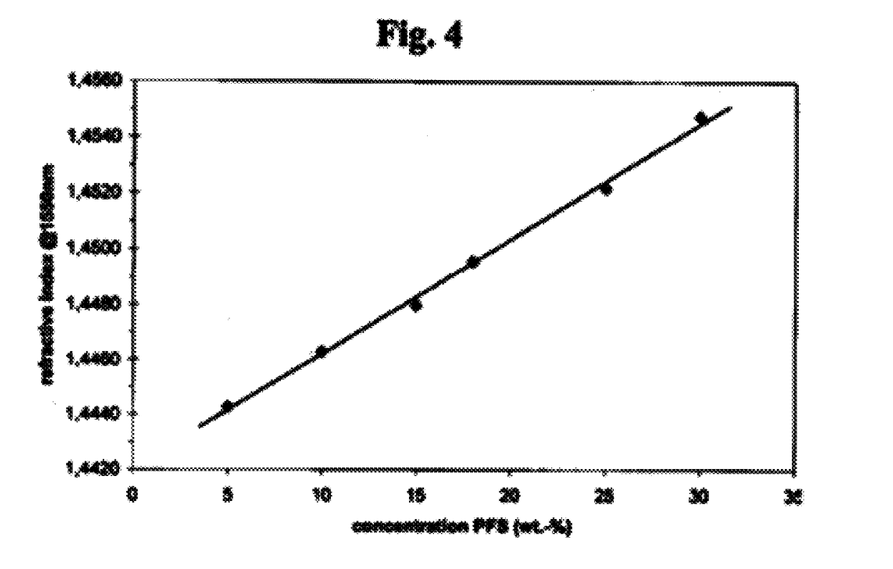
FIG. 4 shows the refractive index of thin layers of copolymers according to example 1 depending on the PFS concentration.
Figure 10:
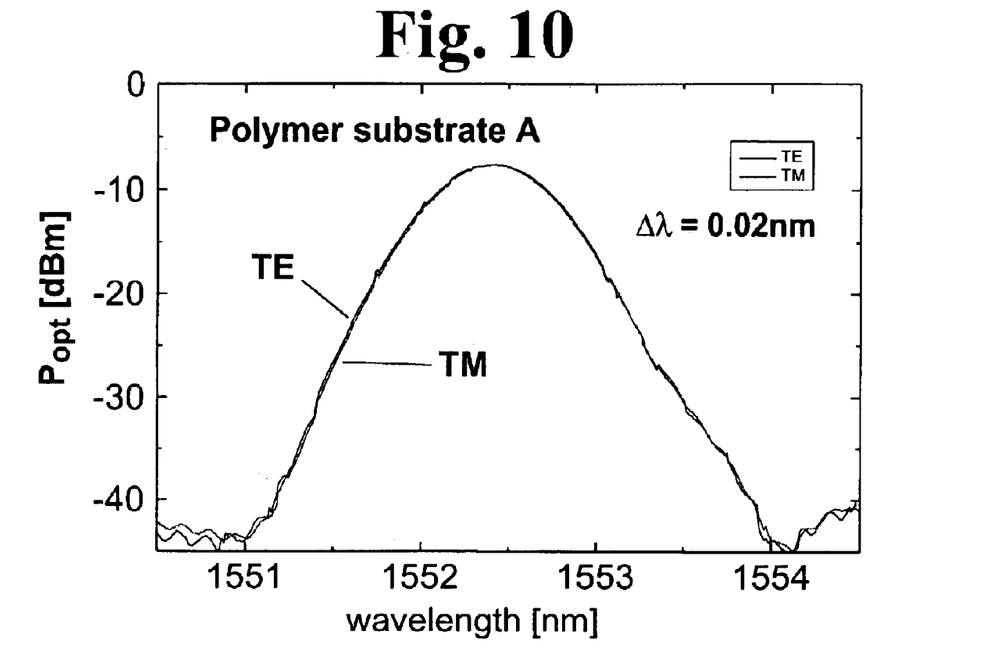
FIG. 10 depicts the polarization shift between the TE (in-plane) and TM (out of plane) polarization of one channel of an all-polymer 8×8AWG prepared according to example 3.

8×8 AWG wavelength multiplexing/demultiplexing devices with a channel spacing of 200 GHz (1.6 nm) at $\lambda$=1550 nm were fabricated using waveguide materials according to example 1 and the polymeric substrates A to C of example 2. FIG. 1 shows a sketch of the 8×8 AWG. The polymeric waveguide materials used are fluorinated acrylates composed of pentafluorostyrene (PFS), trifluoroethylmethacrylate (TFM) and glycidylmethacrylate (GMA). As may be seen from FIG. 4, the refractive index follows a linear function of the PFS-concentration. By changing the PFS-concentration, the refractive index can be varied over a relatively large range, which allows for adjusting a refractive index difference of $\square$n between the core and the cladding material. The polymer waveguide layers were deposited by spin-coating and cross-linked by heating and structured by means of conventional photolithography and RIE. The method of construction of the device may schematically be derived from FIG. 5. FIG. 6 shows the cross-section of a completed all-polymer multi-layer structure with a core size of 6 $\mu$m×6 $\mu$m. The measured optical loss of a polymer channel waveguide fabricated in this way amounted to <0.8 dB/cm in the 1.55 $\mu$m wavelength region. The spectral transmission characteristics of the fabricated AWG devices were measured using a tunable laser and optical power meters. FIG. 9 depicts the measured transmission spectra and FIG. 10 the polarization shift between the TE and TM mode of an all-polymer 8×8AWG. The crosstalk level can be seen to be well below −30 dB, and the insertion loss between 5.8 dB for the center port and 7.5 dB for the edge ports. The polarization shift is less than 0.02 nm without any extra polarization compensation. These results prove the all-polymer AWG to exhibit a crosstalk equivalent to that of standard silica AWG's, but superior polarization dependence. The thermal behavior of the AWG router was investigated by placing the AWG router on a Peltier thermocontroller.

Figure 11:
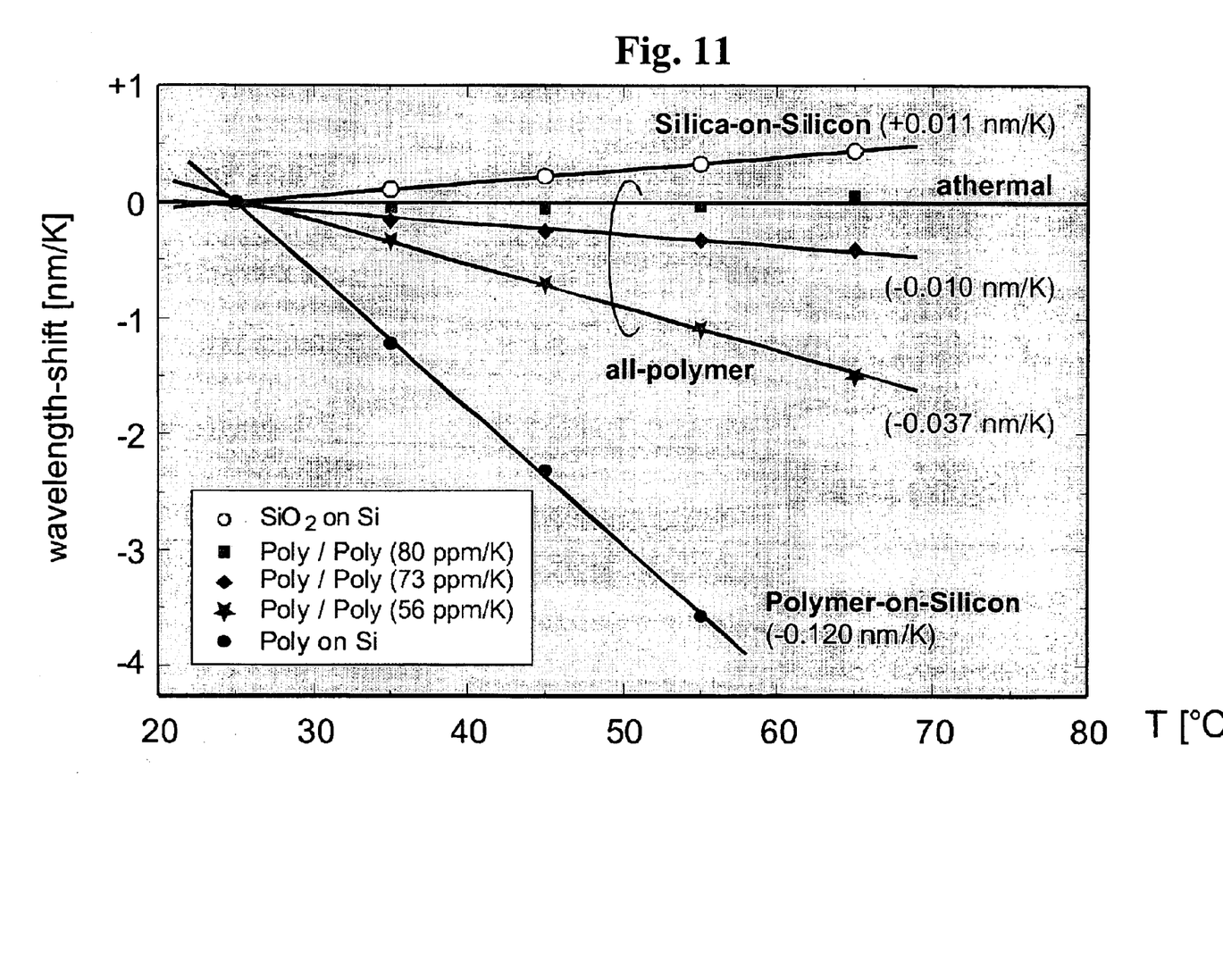
FIG. 11 FIG. shows the details of the measured temperature dependence of polymer AWG Multiplexing/demultiplexing devices produced according to example 4 and such devices made from silica-on-silicon and polymer-on-silicon for reference FIG. 12. shows $\Delta\lambda$ values for a temperature difference of 40° C. for example 4, substrates A, B, and C, and for a silicon substrate (designated as substrate D), when used with the polyacrylate waveguide structure of example 4.
Figure 12:
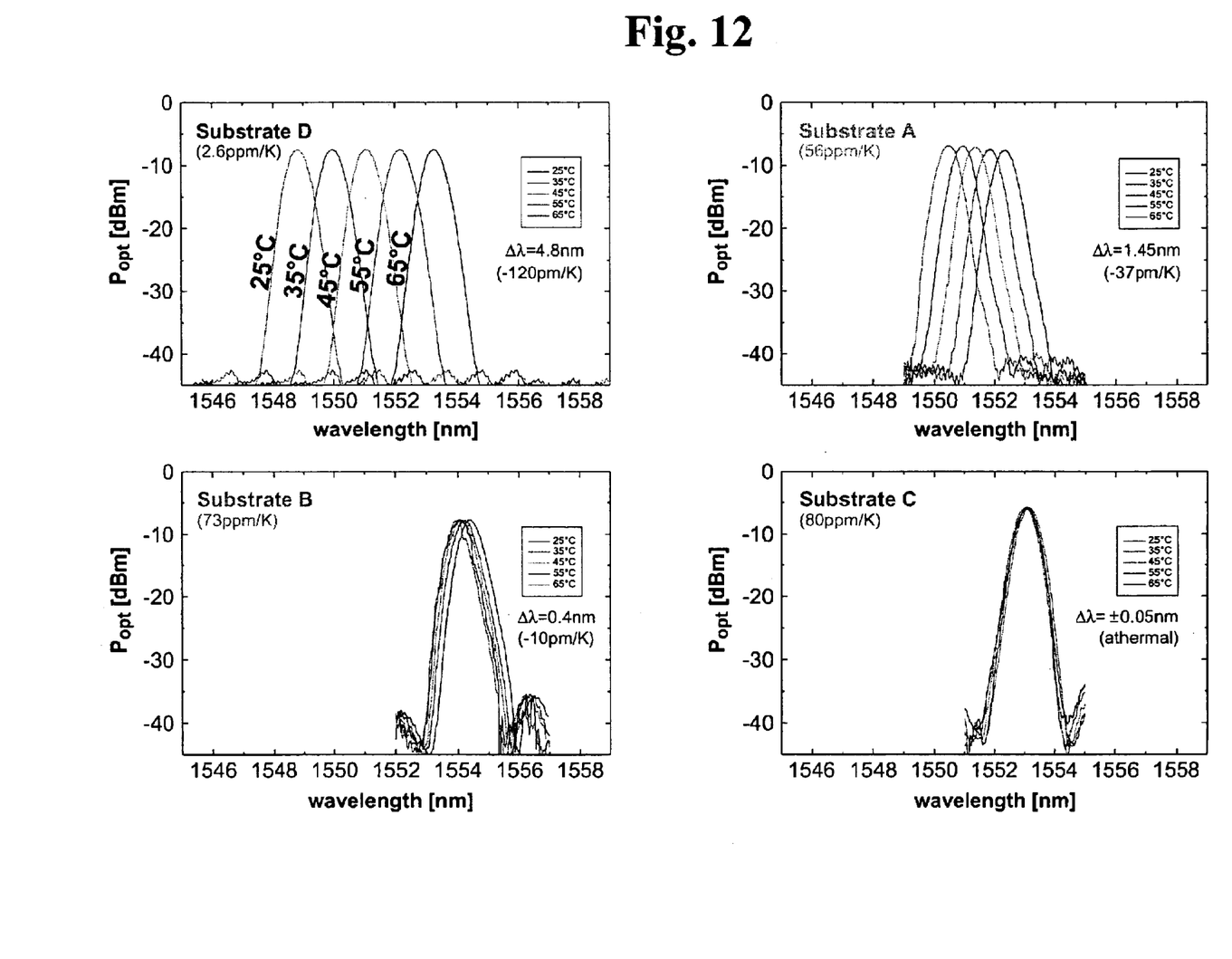
Figure 13:
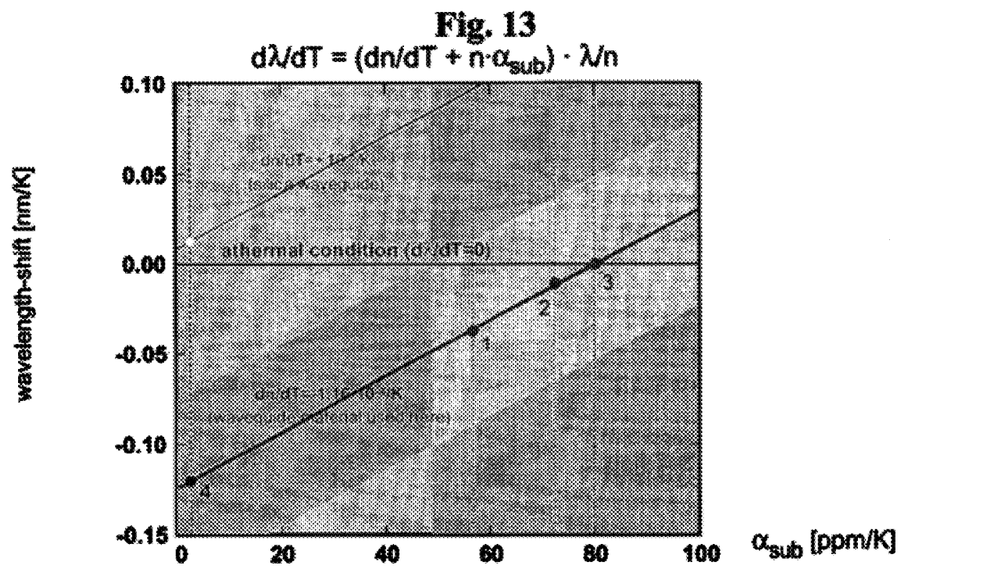
FIG. 13 depicts the shift of the central wavelength against the CTE of the substrate for example 4 (using substrates A, B, and C) and for a silicon substrate used with the polyacrylate waveguide structure of example 4. This figure also shows the dependence of the central wavelength of a silica AWG on the substrate CTE.

As already mentioned above, the central wavelength of an AWG multiplexer can be expressed by:

$$d\lambda_0/dT = (dn_c/dT + n_c*\alpha_{sub})*(\lambda_0/n_c)$$

where $\lambda_0$ represents the central wavelength, $n_c$ the effective refractive index of the waveguide, and $\alpha_{sub}$ the CTE of the substrate. The TO coefficient of the polymer waveguide, $dn_c/dT$, is negative (−1.16*10$^{-4}$/K in example 1), whereas the CTE of the substrates A to C. $\alpha_{sub}$ is positive. For polymer AWG's having the composition of example 1 on a silicon substrate ($\alpha$ sub=2.63 ppm/K), the calculated tuning rate is −0.120 nm/K. This was confirmed in our study by fabricating a respective fluoroacrylate AWG on a silicon substrate. However, if the CTE value of the substrate material is chosen such as to satisfy to the relationship $$n_c*\alpha_{sub} = |dn_c/dT|$$

athermal behaviour of the AWG can be expected. For the waveguide material used in combination with a waveguide material according to example 1, the calculated $\alpha_{sub}$ value for the athermal condition should be $\alpha_{sub}$=80 ppm/K. We have measured the CTE values for a multiplicity of different polymer materials in our laboratory and found that polycyanates produced from di-cyanates as used in example 2 as monomers or comonomers may cover a range of 56 ppm/K to about 85 ppm/K, depending on the chemical composition. This range includes the calculated value required for the athermal case. Therefore, all-polymer AWG devices were fabricated on three different polymer substrates (substrates A, B, and C of example 2). The CTE values of substrates A, B, and C were 56 ppm/K, 73 ppm/K, and 80 ppm/K, respectively. The AWG fabricated on substrate A exhibited a negative temperature tuning rate of −0.037 nm/K, and the AWG router fabricated on substrate B exhibited a smaller tuning rate of only—0.010 nm/K, thus being one order of magnitude lower than that of the polymer AWG on silicon-substrate. The AWG fabricated on substrate C showed a temperature dependent wave-length of only ±0.05 nm over the entire temperature range between 25° C. to 65° C. FIGS. 11 and 12 depict the respective results. In FIG. 12, an additional AWG-device with polymeric waveguide on a silicone substrate is shown for reference. FIG. 11 shows the details of the measured temperature dependence of all produced polymer AWG Multiplexing/demultiplexing devices. The graphs show the performance of the respective materials as detailed above. Poly (80 ppm/K) means substrate C., Poly (73 ppm/K) means substrate B and Poly(56 ppm/K) means substrate A. For comparison, the temperature dependence of a standard silica on silicon AWG and that of an AWG wherein the polymer of the waveguide structure is that of example 3 on a silicon substrate, is included. As a result, the achievement of virtually perfect athermal behaviour in the case of substrate C can be noted. The temperature shift of the central wavelength is less than +/−0.05 nm in the whole temperature range.

What is claimed is:

1. Optical waveguide device comprising at least a substrate having a defined coefficient of thermal expansion (CTE) and supported thereon a waveguide structure having a defined thermooptical coefficient (TO), wherein at least either of the substrate or of the waveguide structure is made of an mainly or merely organic polymer material and wherein the CTE of the substrate and the TO of the waveguide structure are such that the following equation is fulfilled:

$$\left(\frac{dn_c}{dT}\right) + n_c \cdot \alpha_{sub} \cong 0$$

wherein $$\left(\frac{dn_c}{dT}\right)$$

is the thermooptical coefficient (TO) of the waveguide structure, $n_c$ is the effective refractive index of the optical waveguide, and $\alpha_{sub}$ represents the CTE of the substrate.

2. Optical waveguide device according to claim 1 wherein the substrate is made from a material consisting of or comprising at least a polycyanate which has been prepared from at least one dicyanate.

3. Optical waveguide device according to claim 2, wherein the substrate is made from a material consisting of or comprising at least a polycyanate which has been prepared from at least one dicyanate in mixture with at least one comonomer, selected from the group consisting of epoxides, monocyanates, phenols, fluoroaliphatic monoalcohols or diols, amines, which are upon copolymerization are integrated into the polycyanate network.

4. Optical waveguide device according to claim 3 wherein the substrate is made from a material consisting of or comprising at least a polycyanate which has been prepared from at least one dicyanate in mixture with at least one comonomer, selected from the group consisting of epoxides, monocyanates, phenols, fluoroaliphatic monoalcohols or diols, amines, which are upon copolymerization are integrated into the polycyanate network, and from a thermosetting material, the said materials being incapable to react with each other whereby an interpenetration network is formed.

5. Optical waveguide device according to claim 3 wherein the substrate is made from a material consisting of or comprising at least a polycyanate which has been prepared from at least one dicyanate in mixture with at least one comonomer, selected from the group consisting of epoxides, monocyanates, phenols, fluoroaliphatic monoalcohols or diols, amines, which are upon copolymerization are integrated into the polycyanate network, and from a polymer which has thermoplastic or elastomeric properties, whereby a composite is formed.

6. Optical waveguide device according to claim 2 wherein the substrate is made from a material consisting of or comprising at least a polycyanate which has been prepared from at least one dicyanate, and from a thermosetting material, the said materials being incapable to react with each other whereby an interpenetration network is formed.

7. Optical waveguide device according to claim 2 wherein the substrate is made from a material consisting of or comprising at least a polycyanate which has been prepared from at least one dicyanate, and from a polymer which has thermoplastic or elastomeric properties, whereby a composite is formed.

8. Optical waveguide device according to claim 1, further comprising at least one cladding layer, selected from a bottom cladding layer and a top cladding layer.

9. Optical waveguide device according to claim 8, wherein the material of the cladding(s) is such that its TO coefficient is identical or almost identical to that of the waveguide structure.

10. Optical waveguide device according to claim 1 which functions based on the principle of optical pathlength-differences, the device preferably selected from the group of optical waveguide filters relying on the exploitation of optical path length differences.

11. Optical waveguide device according to claim 10, comprising the group consisting of directional couplers, Fabry-Perot resonators, DFB and DBR-filters, MZI (Mach-Zehnder-Interferometer) filters, ring resonators and grating assisted couplers.

12. Optical waveguide device according to claim 1 wherein the waveguide structure is made from a material consisting of or comprising at least a polyacrylate or polymethacrylate.

13. Optical waveguide device according to claim 12, wherein the polyacrylate or polymethacrylate contains fluorogroups.

14. Optical waveguide device according to claim 1, wherein the central wavelength shift upon changes in temperature $$\left(\frac{d\lambda_0}{dT}\right)$$

is 0±0.010 nm/K.

15. Optical waveguide device according to claim 1, wherein the central wavelength shift $$\left(\frac{d\lambda_0}{dT}\right)$$

upon changes in temperature between 25° C. and 65° C. is 0±0.16 nm.

16. Optical waveguide device according to claim 1, wherein the central wavelength shift $$\left(\frac{d\lambda_0}{dT}\right)$$

upon changes in temperature between −10° C. and +80° C. is 0±0.08 nm.

17. Optical waveguide device according to claim 1, wherein the waveguide structure material has a negative TO coefficient and the substrate material has a positive CTE.

18. Optical waveguide device according to claim 1, wherein the substrate and the waveguide structure are made of a mainly or merely organic polymer material.

19. Optical waveguide device according to claim 1 wherein the device is selected from the group consisting of devices being optical arrayed waveguide gratings, multiplexers, demultiplexers, or a combination thereof.

20. Optical waveguide device according to claim 1 wherein the substrate is made from a material consisting of or comprising at least a polycyanate which has been prepared from at least one dicyanate, optionally in mixture with at least one comonomer, selected from the group consisting of epoxides, monocyanates, phenols, fluoroaliphatic monoalcohols or diols, amines, which are upon copolymerization are integrated into the polycyanate network, and wherein the waveguide structure is made from a material consisting of or comprising at least a polyacrylate or polymethacrylate.

* * * * *